(12) United States Patent
Abe et al.

(10) Patent No.: US 11,138,832 B2
(45) Date of Patent: Oct. 5, 2021

(54) GAME SYSTEM AND GAME APPARATUS

(71) Applicant: SEGA CORPORATION, Tokyo (JP)

(72) Inventors: Teruhito Abe, Tokyo (JP); Naoki Nakamura, Tokyo (JP); Koichi Kimata, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 16/763,619

(22) PCT Filed: Sep. 14, 2018

(86) PCT No.: PCT/JP2018/034279
§ 371 (c)(1),
(2) Date: May 13, 2020

(87) PCT Pub. No.: WO2019/102696
PCT Pub. Date: May 31, 2019

(65) Prior Publication Data
US 2020/0286336 A1    Sep. 10, 2020

(30) Foreign Application Priority Data
Nov. 24, 2017    (JP) .............................. JP2017-226038

(51) Int. Cl.
*G07F 17/32* (2006.01)
(52) U.S. Cl.
CPC ...... *G07F 17/3251* (2013.01); *G07F 17/3223* (2013.01); *G07F 17/3239* (2013.01)
(58) Field of Classification Search
CPC ............. G07F 17/3251; G07F 17/3223; G07F 17/3239
See application file for complete search history.

(56) References Cited

U.S. PATENT DOCUMENTS

2009/0037326 A1    2/2009  Chitti et al.
2014/0080578 A1*  3/2014  Nguyen .............. G07F 17/3204
                                                                463/25

FOREIGN PATENT DOCUMENTS

JP    2007-102319    4/2007
JP    2008-009748    1/2008
(Continued)

OTHER PUBLICATIONS

International Search Report for PCT/JP2018/034279 dated Oct. 9, 2018.

*Primary Examiner* — Werner G Garner
(74) *Attorney, Agent, or Firm* — IPUSA, PLLC

(57) ABSTRACT

A game system includes a receiver that receives an input of setting information related to the use of a service for an electronic money payment from a player when the service is used; a reader that reads electronic money information from a recording medium; a payment unit that makes a payment corresponding to the setting information received from the player by using the electronic money information read from the recording medium; and a setting information recorder that records first setting information input by the player. When the service is used, a screen for receiving the input of the first setting information from the player is generated when the first setting information is recorded in the setting information recorder, and a screen for receiving the input of second setting information from the player is generated when the first setting information is not recorded in the setting information recorder.

8 Claims, 12 Drawing Sheets

(56) References Cited

FOREIGN PATENT DOCUMENTS

| | | |
|---|---|---|
| JP | 2008-158835 | 7/2008 |
| JP | 2012-048692 | 3/2012 |
| JP | 2016-115145 | 6/2016 |
| JP | 2017-004256 | 1/2017 |

* cited by examiner

PLAYER INFORMATION

| PLAYER ID | IC CARD ID | PLAYER NAME | FAVORITE SETTING INFORMATION FOR ELECTRONIC MONEY PAYMENT | ... |
|---|---|---|---|---|

SETTING INFORMATION

| ELECTRONIC MONEY PAYMENT SETTING INFORMATION USED BY PLAYER | ... |
|---|---|

| BRAND OF ELECTRONIC MONEY (TRANSPORTATION, SUPERMARKET, etc.) | SERVICE TYPE (SERVICE CONTENT, PAYMENT AMOUNT, etc.) |
|---|---|
| | |

(B)

| PRIORITY | BRAND OF ELECTRONIC MONEY | SERVICE TYPE |
|---|---|---|
| 1 | TRANSPORTATION | PURCHASE OF 1 CREDIT, PAYMENT OF ¥100 |
| 2 | TRANSPORTATION | PURCHASE OF 5 CREDITS, PAYMENT OF ¥500 |
| 3 | SUPERMARKET | PURCHASE OF 1 CREDIT, PAYMENT OF ¥100 |
| | | |

(C)

| STATUS | BRAND OF ELECTRONIC MONEY | SERVICE TYPE |
|---|---|---|
| STAYING IN TOWN | TRANSPORTATION | PURCHASE OF 10 ITEMS A, PAYMENT OF ¥1000 |
| SEARCHING FIELD | TRANSPORTATION | PURCHASE OF 2 ITEMS B, PAYMENT OF ¥500 |
| IN COMBAT | TRANSPORTATION | PURCHASE OF 1 ITEM C, PAYMENT OF ¥100 |
| | | |

GAME SYSTEM AND GAME APPARATUS

TECHNICAL FIELD

The present invention relates to a game system and a game apparatus.

BACKGROUND ART

There exists a known electronic money system including an electronic money terminal device that performs transactions using electronic money with a contactless IC card and a management server that is connected to the electronic money terminal device. Such an electronic money system is attracting attention as a mechanism that can handle small payments and reduce the inconvenience of cash handling and the risk of carrying cash (see, for example, Patent Document 1).

RELATED-ART DOCUMENT

Patent Document

Patent Document 1: Japanese Patent No. 5003143

DISCLOSURE OF INVENTION

Problems to be Solved by the Invention

For example, in an amusement facility such as a game center, a player usually pays a play fee by inserting coins corresponding to the play fee into a game apparatus to play a game. It is hoped to use electronic money for the payment of such play fees.

However, with the related-art electronic money system, for each payment, a player needs to select a type of electronic money to use, specify the amount to pay, and then indicate the intention to pay with electronic money. For example, when repeatedly playing the same game, it may be troublesome for the player to perform operations to pay play fees with electronic money.

The present invention is made in view of the above problem, and an object of the present invention is to provide a game system that can reduce cumbersome electronic money payment operations.

Means for Solving the Problems

To solve the above problem, according to claim 1 of the present application, there is provided a game system that makes an electronic money payment. The game system includes a setting information receiver that receives an input of setting information related to use of a service for the electronic money payment from a player when the service is used; an electronic money information reader that reads electronic money information from a recording medium that records the electronic money information; a payment unit that makes a payment corresponding to the setting information related to the use of the service and received from the player by using the electronic money information read from the recording medium; and a setting information recorder that records the setting information related to the use of the service and input by the player as first setting information. When the service is used, the setting information receiver generates a screen for receiving the input of the setting information from the player based on the first setting information when the first setting information is recorded in the setting information recorder, and generates the screen for receiving the input of the setting information from the player based on pre-recorded second setting information that is different from the first setting information when the first setting information is not recorded in the setting information recorder.

Advantageous Effect of the Invention

The present invention makes it possible to reduce cumbersome electronic money payment operations.

BRIEF DESCRIPTION OF THE DRAWINGS

FIG. 15 is a drawing illustrating examples of favorite setting information for electronic money payment.

DESCRIPTION OF EMBODIMENTS

Embodiments of the present invention are described below in detail.

First Embodiment

<System Configuration>

Figure 1:
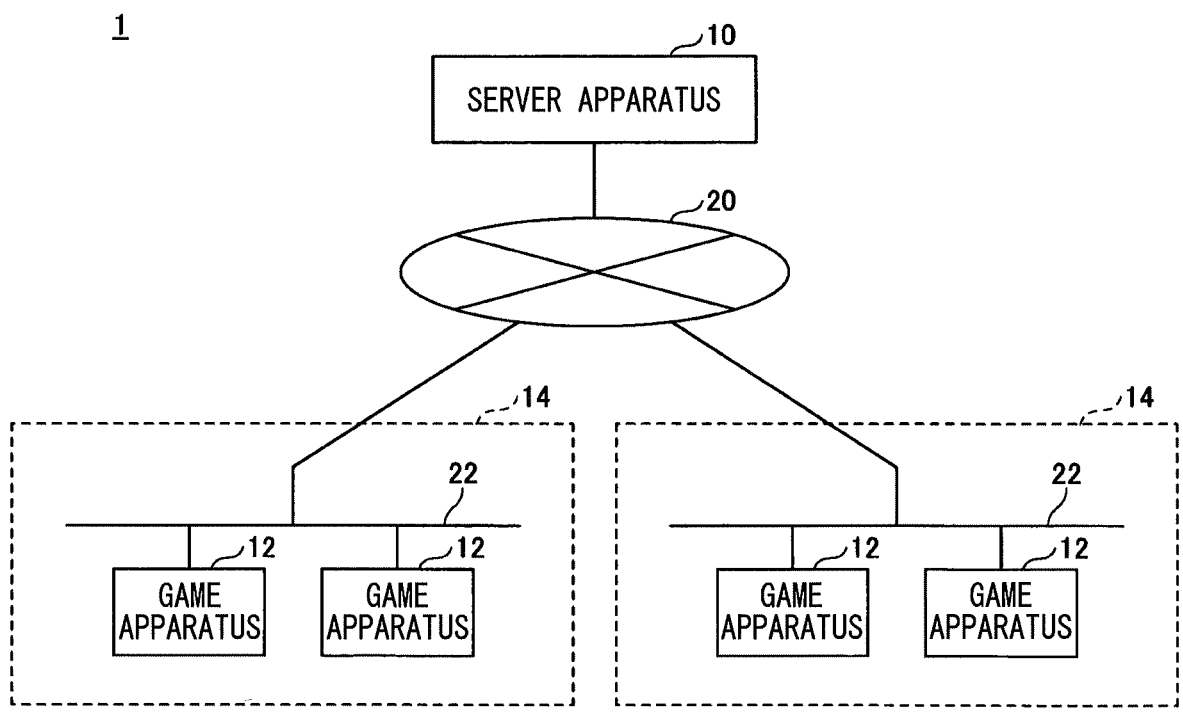
FIG. 1 is a drawing illustrating an example of a configuration of a game system according to an embodiment.

FIG. 1 is a drawing illustrating an example of a configuration of a game system according to an embodiment. In a game system 1, a server apparatus 10 is connected via a network 20 such as the Internet to networks 22 such as LANs of local shops 14 such as amusement facilities. One or more game apparatuses 12 are installed in each of the local shops 14. The game apparatuses 12 are connected to the network 22 of the shop 14. The game system 1 illustrated in FIG. 1 is an example, and the game system 1 may have various configurations depending on its applications and purposes. For example, the server apparatus 10 may have a distributed configuration implemented by multiple computers, or may be connected to the networks 22 of the shops 14.

The server apparatus 10 manages information on games played on the game apparatuses 12, and information on players who play the games on the game apparatuses 12. Each game apparatus 12 is an example of an apparatus (game housing) on which a player plays a game and makes settlement (payment) with electronic money.

<Hardware Configuration>

Figure 2:
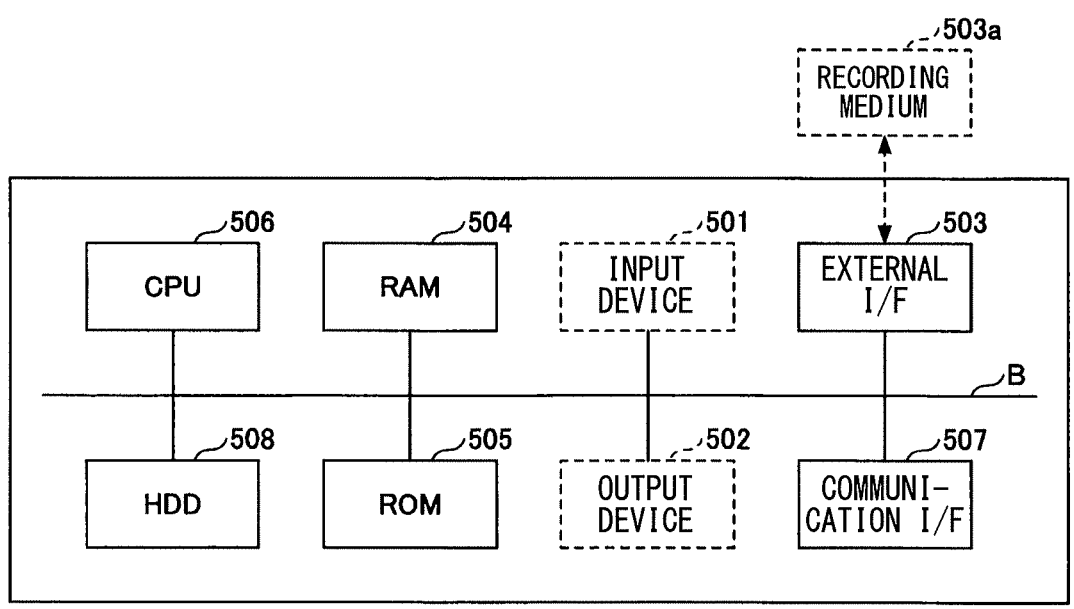
FIG. 2 is a drawing illustrating an example of a hardware configuration of a computer according to an embodiment.

The server apparatus 10 of FIG. 1 is implemented by, for example, a computer with a hardware configuration illustrated in FIG. 2. FIG. 2 is a drawing illustrating an example of a hardware configuration of a computer according to the present embodiment.

The computer illustrated in FIG. 2 includes an input device 501, an output device 502, an external I/F 503, a RAM 504, a ROM 505, a CPU 506, a communication I/F 507, and an HDD 508 that are connected to each other via a bus B. The input device 501 and the output device 502 may be connected to the computer when necessary.

The input device 501 is, for example, a touch panel, operation keys and buttons, a keyboard, and a mouse used by a player to input various signals. The output device 502 is implemented by, for example, a liquid crystal display or an organic EL display for displaying screens and a speaker for outputting sound data such as voice and music. The communication I/F 507 is an interface for connecting the computer to the network 20. Accordingly, the computer can perform data communications via the communication I/F 507.

The HDD 508 is an example of a nonvolatile storage device for storing programs and data. The stored programs and data include an OS that is basic software for controlling the entire computer and applications that provide various functions on the OS. Instead of the HDD 508, the computer may use a drive device (for example, a solid-state drive: SSD) that uses a flash memory as a storage medium.

The external I/F 503 is an interface with an external device. An example of the external device is a recording medium 503a. The computer 500 can read and/or write data from or to the recording medium 503a via the external I/F 503. Examples of the recording medium 503a include a flexible disk, a CD, a DVD, an SD memory card, and a USB memory.

The ROM 505 is an example of a nonvolatile semiconductor memory (storage device) that can retain programs and data even when power is turned off. The ROM 505 stores programs and data such as a BIOS executed when the computer is started, OS settings, and network settings. The RAM 504 is an example of a volatile semiconductor memory (storage device) that temporarily stores programs and data.

The CPU 506 is a processor that loads programs and data read from a storage device such as the ROM 505 or the HDD 508 onto the RAM 504 and executes processes (including processes for generating images and sounds to be output to the output device 502) to control the entire computer and implement the functions of the computer. The server apparatus 10 of the present embodiment can perform various processes described later by executing programs on the computer with the above-described hardware configuration.

Figure 3:
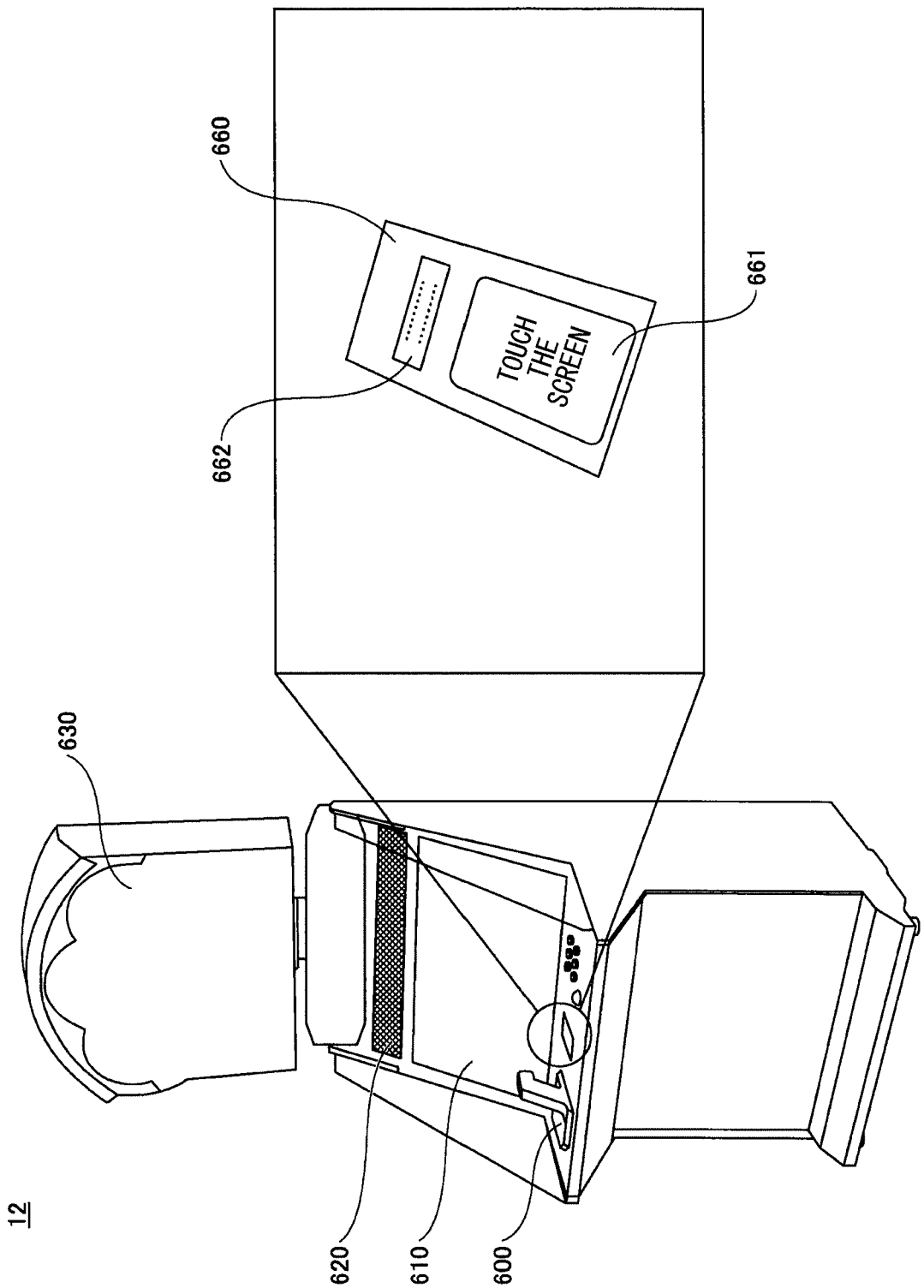
FIG. 3 is an external view of an example of a game apparatus.

The game apparatus 12 of FIG. 1 has an appearance as exemplified in FIG. 3. FIG. 3 is an external view of an example of a game apparatus. The game apparatus 12 of FIG. 3 includes an operation unit 600, an image display unit 610, a sound unit 620, and lights 630 included in a decorative advertising display.

The operation unit 600 is a device used by a player to select or input necessary information and a command and is implemented by, for example, push buttons. An IC card unit 660 is provided on a panel on which the operation unit 600 is disposed. The IC card unit 660 includes an IC card reader-writer 661 and an electronic money display 662.

The player causes the IC card reader-writer 661 to read a game IC card (a recording medium storing or associating various types of information such as player identification information and play data of various games) and an electronic money IC card (a recording medium storing or associating monetary values as electronic money information). Also, the player can view various messages displayed on the electronic money display 662.

The image display unit 610 is a touch panel game display. The sound unit 620 includes a built-in speaker and outputs sounds such as game sounds and payment sounds (normal/error). The lights 630 perform predetermined lighting and flashing operations as effects corresponding to the scenes of a game.

Figure 4:
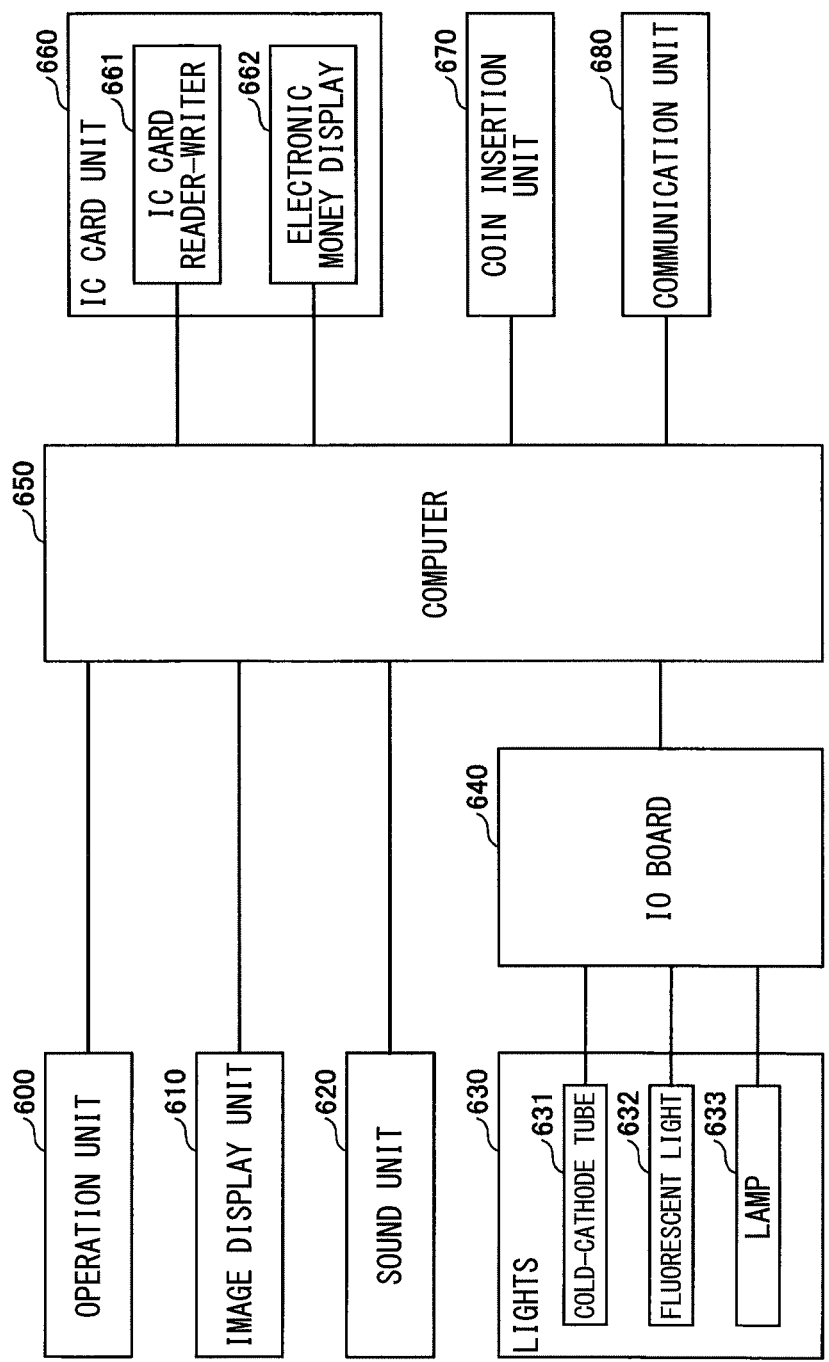
FIG. 4 is a drawing illustrating an example of a hardware configuration of a game apparatus according to an embodiment.

The game apparatus 12 in FIG. 1 has a hardware configuration as exemplified in FIG. 4. FIG. 4 is a drawing illustrating an example of a hardware configuration of a game apparatus according to the present embodiment.

The game apparatus 12 includes a computer 650 that controls the entire game apparatus 12. The game apparatus 12 also includes the operation unit 600, the image display unit 610, the sound unit 620, and an IO board 640 that are connected to the computer 650. Further, the game apparatus 12 includes the IC card unit 660, a coin insertion unit 670, and a communication unit 680 that are connected to the computer 650.

The operation unit 600 is used by the player to perform game operations. The image display unit 610 displays a game screen. The sound unit 620 includes, for example, an amplifier and a speaker, and outputs game sounds. Various lights 630 such as a cold-cathode tube 631, a fluorescent light 632, and a lamp 633 are connected to the IO board 640. For example, the lights 630 are controlled to perform predetermined lighting and flashing operations as effects corresponding to scenes of a game.

The game apparatus 12 also includes the IC card unit 660 and the coin insertion unit 670. The IC card unit 660 includes the IC card reader-writer 661 that reads and writes information from and to an IC card that is a storage medium. When the player holds, for example, a game IC card over the IC card unit 660 to cause the IC card unit 660 to read IC card information such as an IC card ID, the game apparatus 12 obtains player information associated with the IC card information from the server apparatus 10. Thus, the game apparatus 12 can identify a player who plays the game. Also, the player can make a payment (settlement) with electronic money by, for example, holding an electronic money IC card over the IC card unit 660 and thereby transferring a monetary value charged (stored) in the electronic money IC card to the game apparatus 12.

The coin insertion unit 670 is an input mechanism to which the player inputs a credit with, for example, coins. The communication unit 680 is an interface that connects the game apparatus 12 to the network 22. The game apparatus 12 can perform data communications via the communication unit 680.

<Software Configuration>
<<Functional Blocks>>

Figure 5:
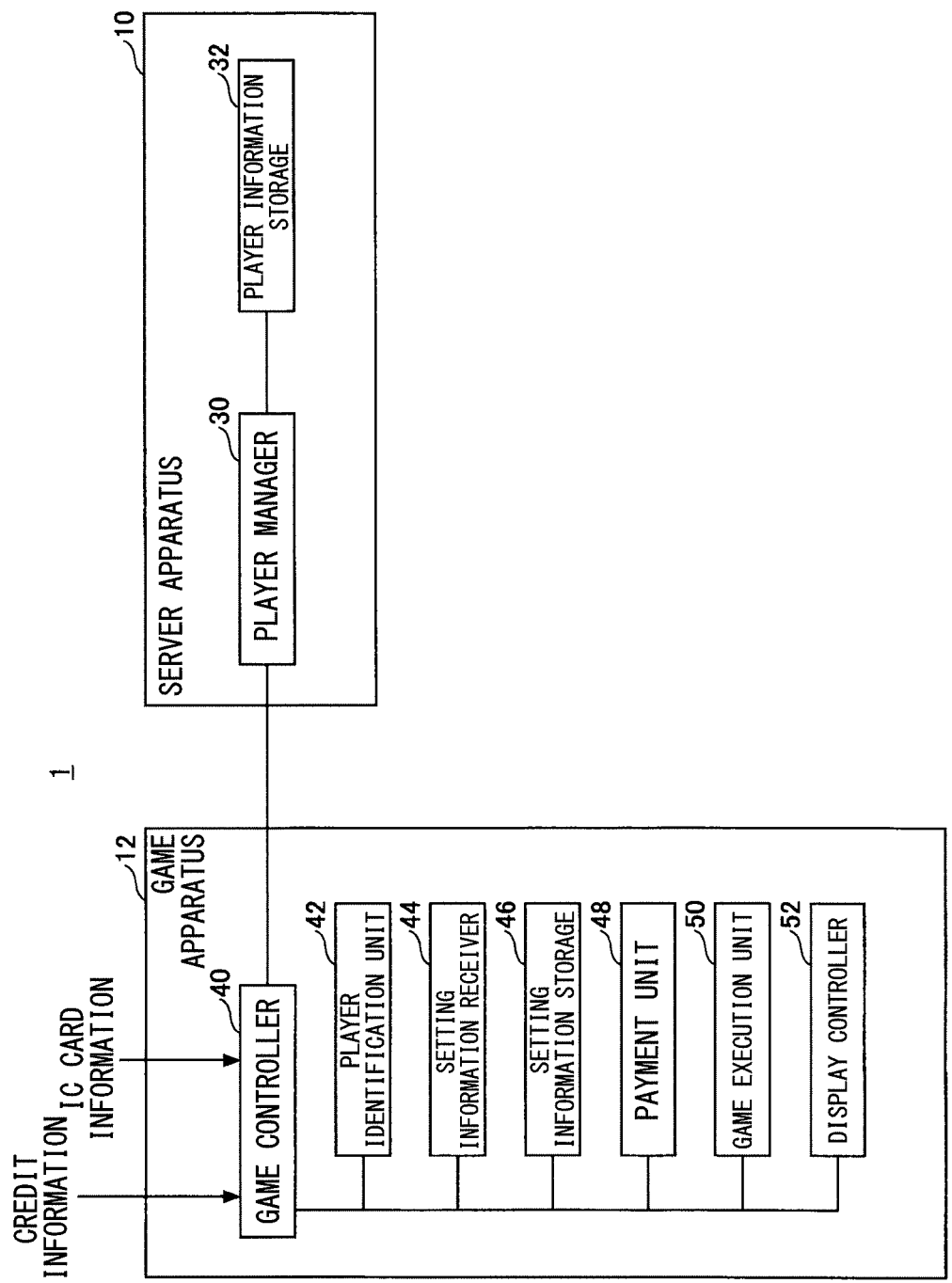
FIG. 5 is a block diagram illustrating an example of a functional configuration of a game system according to an embodiment.

A software configuration of the game system 1 according to the present embodiment is described. FIG. 5 is a block diagram illustrating an example of a functional configuration of a game system according to the present embodiment. The server apparatus 10 implements a player manager 30 and a player information storage 32 by executing a server program. Also, the game apparatus 12 executes a client program to implement a game controller 40, a player identification unit 42, a setting information receiver 44, a setting information storage 46, a payment unit 48, a game execution unit 50, and a display controller 52.

The player manager 30 of the server apparatus 10 manages player information stored in the player information storage 32. The player information storage 32 stores player information. The game controller 40 of the game apparatus 12 receives IC card information read by the IC card unit 660 from the game IC card or the electronic money IC card of the player and credit information indicating a credit input to the coin insertion unit 670.

When receiving IC card information read from the game IC card, the player identification unit 42 obtains player information associated with the received IC card information from the server apparatus 10 and thereby identifies a player who plays a game.

When the game apparatus 12 provides the player with paid services (e.g., sales of credits and in-game items), the setting information receiver 44 receives an input of setting information for electronic money payment (setting information for the use of services) from the player. The setting information received by the setting information receiver 44 includes, for example, information indicating the type (brand) of electronic money used for payment and information indicating the type of service used by the player. Details of a mechanism with which the setting information receiver 44 receives an input of setting information from the player are described later.

For example, the type of service used by the player indicates a service content such as the sale of credits for a game play or the sale of an item used in a game and the price of the service. For example, "purchase of 1 credit" and "purchase of 3 credits" are examples of service contents.

The setting information storage 46 stores the setting information received by the setting information receiver 44 from the player (setting information used (input) by the player). If the player information obtained by the player identification unit 42 from the server apparatus 10 includes setting information, the setting information storage 46 stores the setting information as setting information used by the player.

The setting information storage 46 also stores standard (default) setting information that is used when setting information input by the player is not stored. The setting information may be input by the player when the player uses electronic money, and may also be received from a mobile terminal (such as a smartphone) of the player via a website associated with the service and set in the player information storage 32 of the server apparatus 10 in advance.

The payment unit 48 makes a payment with electronic money according to an input of setting information received by the setting information receiver 44 from the player. The game execution unit 50 controls the display of game screens, the output of game sounds, and the lighting and flashing operations of the lights 630 to allow the player to play a game. The display controller 52 controls images to be displayed on the image display unit 610. For example, the display controller 52 causes the image display unit 610 to display a payment standby screen including an electronic money payment button described later.

Figures 6, 7, 8:
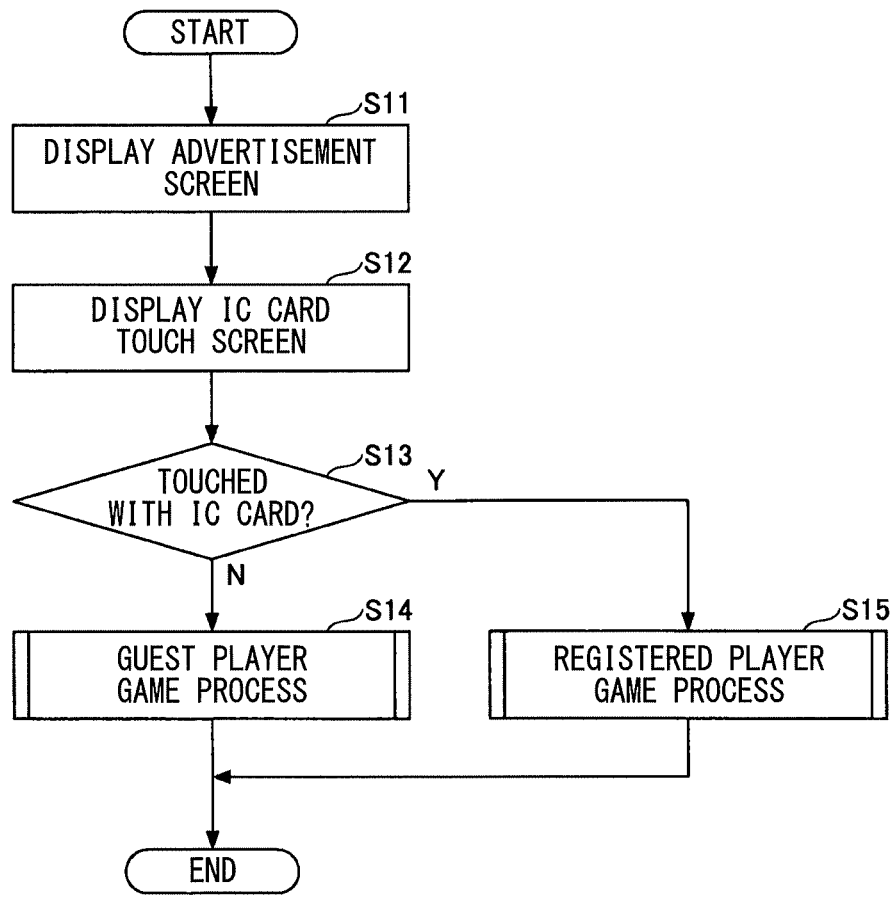
FIG. 6 is a drawing illustrating an example of a configuration of player information stored in a player information storage of a server apparatus.
FIG. 7 is a drawing illustrating an example of a configuration of setting information stored in a setting information storage of a game apparatus.
FIG. 8 is a flowchart illustrating an example of a payment process with electronic money performed by a game system according to an embodiment.

FIG. 6 is a drawing illustrating an example of a configuration of player information stored in a player information storage of a server apparatus. The player information illustrated in FIG. 6 includes items such as a player ID, an IC card ID, a player name, and favorite setting information for electronic money payment.

The item "player ID" is an example of identification information for uniquely identifying a player. The item "IC card ID" is an example of unique IC card information that can be read from an IC card of the player. The item "player name" is the name of the player.

The item "favorite setting information for electronic money payment" is an example of setting information recorded in association with the player ID and is, for example, setting information used for the latest payment with electronic money or frequently-used payment setting information. The item "favorite setting information for electronic money payment" may contain setting information associated with a shop or the type of a game. The server apparatus 10 may have a function to allow the player to log into the server apparatus 10 and edit the item "favorite setting information for electronic money settlement" included in the player information of FIG. 6.

FIG. 7 is a drawing illustrating an example of a configuration of setting information stored in a setting information storage of a game apparatus. The setting information illustrated in FIG. 7 includes an item such as electronic money payment setting information used by the player. For example, the item "electronic money payment setting information used by the player" contains setting information received from the player or setting information included in the player information obtained from the server apparatus 10.

<Processes>

In an example of the present embodiment described below, it is assumed that a player purchases credits for a video game by making payment with electronic money. However, the present invention is not limited to this example. The present embodiment may be applied not only to the purchase of credits and in-game items for a video game, but also to games other than a video game, e.g., to the purchase of medals for a medal game and the purchase of credits for a crane game.

<<Overall Process>>

FIG. 8 is a flowchart illustrating an example of a payment process with electronic money performed by a game system according to the present embodiment. At step S11, the game controller 40 of the game apparatus 12 causes the display controller 52 to display an advertisement (demo) screen on the image display unit 610.

In response to an operation performed by the player or a detection of the player by a sensor, the game controller 40 causes the player identification unit 42 to display an IC card touch screen. The IC card touch screen prompts the player having a game IC card to touch the IC card unit 660 with the game IC card.

When a touch with the game IC card on the IC card unit 660 is detected, the player identification unit 42 obtains, from the server apparatus 10, player information associated with IC card information such as an IC card ID read from the game IC card. When the player information is obtained, the game controller 40 proceeds to step S15 to perform a registered player game process described later where the player is identified.

On the other hand, when the touch with the game IC card on the IC card unit 660 is not detected at step S13 or when player information cannot be obtained from the server apparatus 10, the game controller 40 proceeds to step S14 to perform a guest player game process described later where the player is not identified.

<<S14: Guest Player Game Process>>

Figure 9:
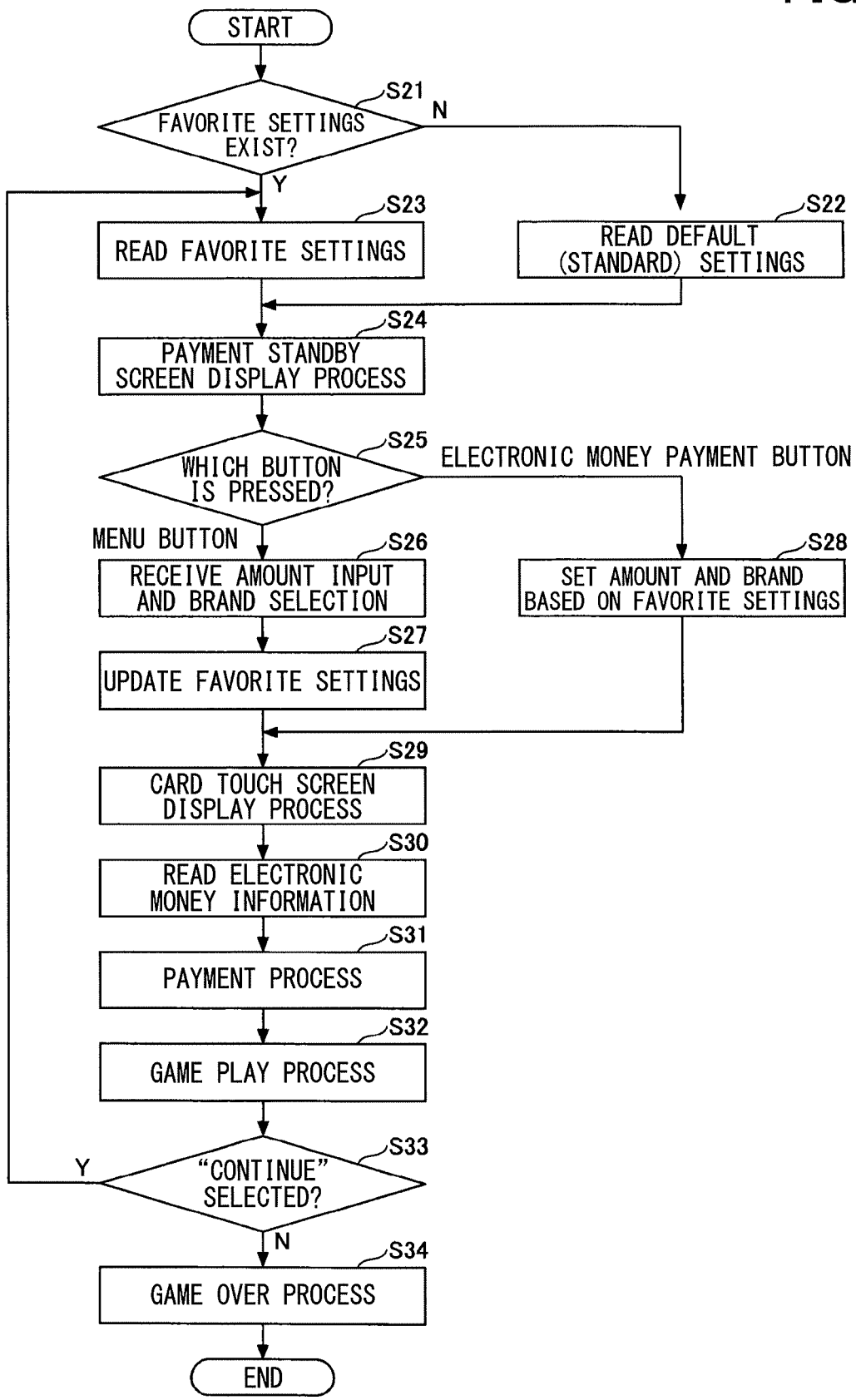
FIG. 9 is a flowchart illustrating an example of a guest player game process.

FIG. 9 is a flowchart illustrating an example of a guest player game process. At step S21, the setting information receiver 44 determines whether "electronic money payment setting information used by the player" is recorded as favorite settings in the setting information storage 46. In the case of a guest player, because favorite settings are not recorded, the process proceeds to step S22. At step S22, the setting information receiver 44 sets standard (default) setting information read from the setting information storage 46 as favorite settings, and proceeds to step S24.

Figure 10:
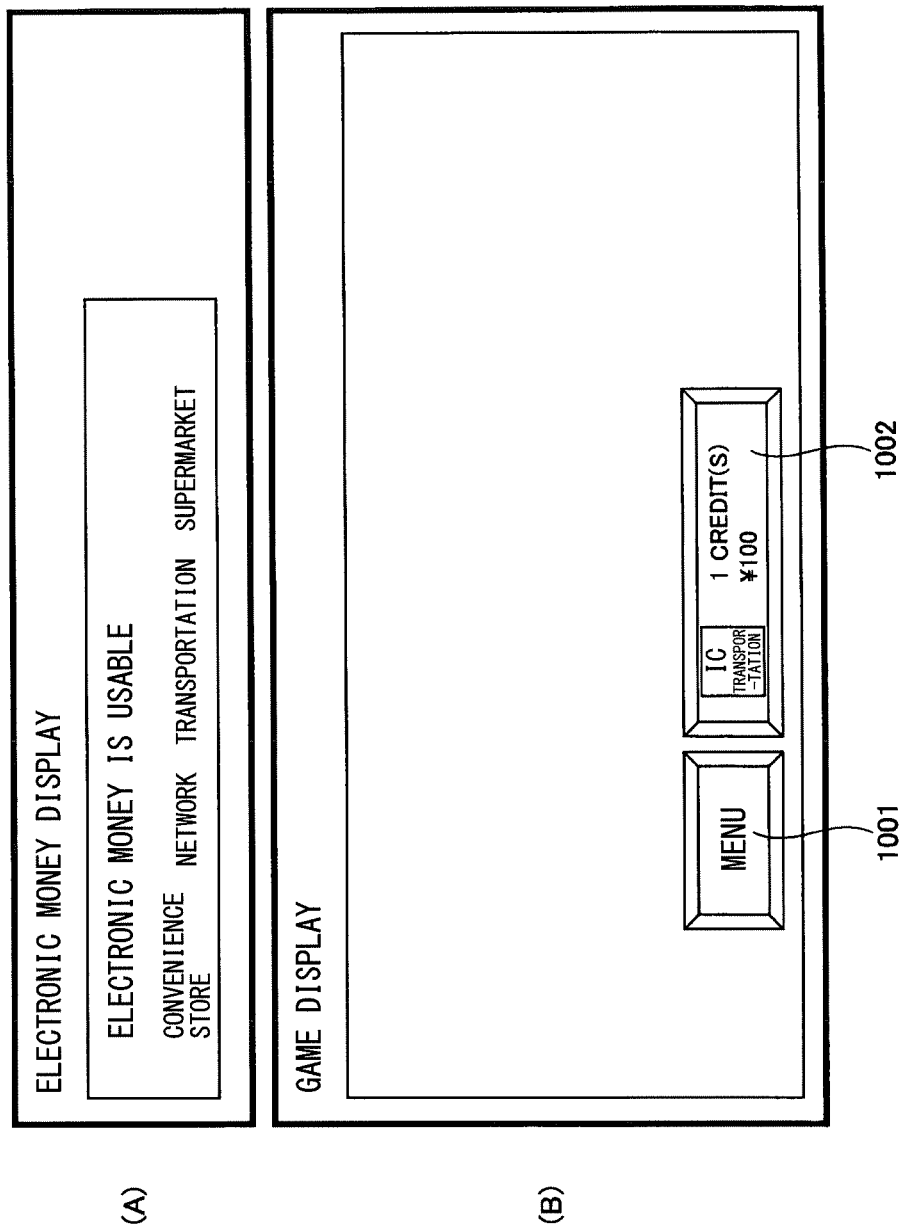
FIG. 10 is an image diagram illustrating an example of a payment standby screen.

At step S24, based on the favorite settings read at step S22, the setting information receiver 44 generates a payment standby screen as exemplified in FIG. 10 and causes the display controller 52 to display the payment standby screen.

FIG. 10 is an image diagram illustrating an example of a payment standby screen. FIG. 10(A) is a screen image of the electronic money display 662. FIG. 10(B) is a screen image of a game display. The game display screen of FIG. 10(B) includes a menu button 1001 and an electronic money payment button 1002. The player can change operations for payment with electronic money as described later by pressing the menu button 1001 or the electronic money payment button 1002.

The menu button 1001 is for proceeding to operations for inputting a service type on an amount input screen described later and for selecting a type of electronic money on a brand selection screen described later. The electronic money payment button 1002 is a button (for example, a shortcut button for performing a preassigned function) for selecting a service type and a type of electronic money indicated by the favorite settings with a single button clicking operation. In the example of FIG. 10, the electronic money payment button 1002 displays a service type (1 CREDIT(S) ¥100) and a type of electronic money (transportation) indicated by the favorite settings.

Figure 11:
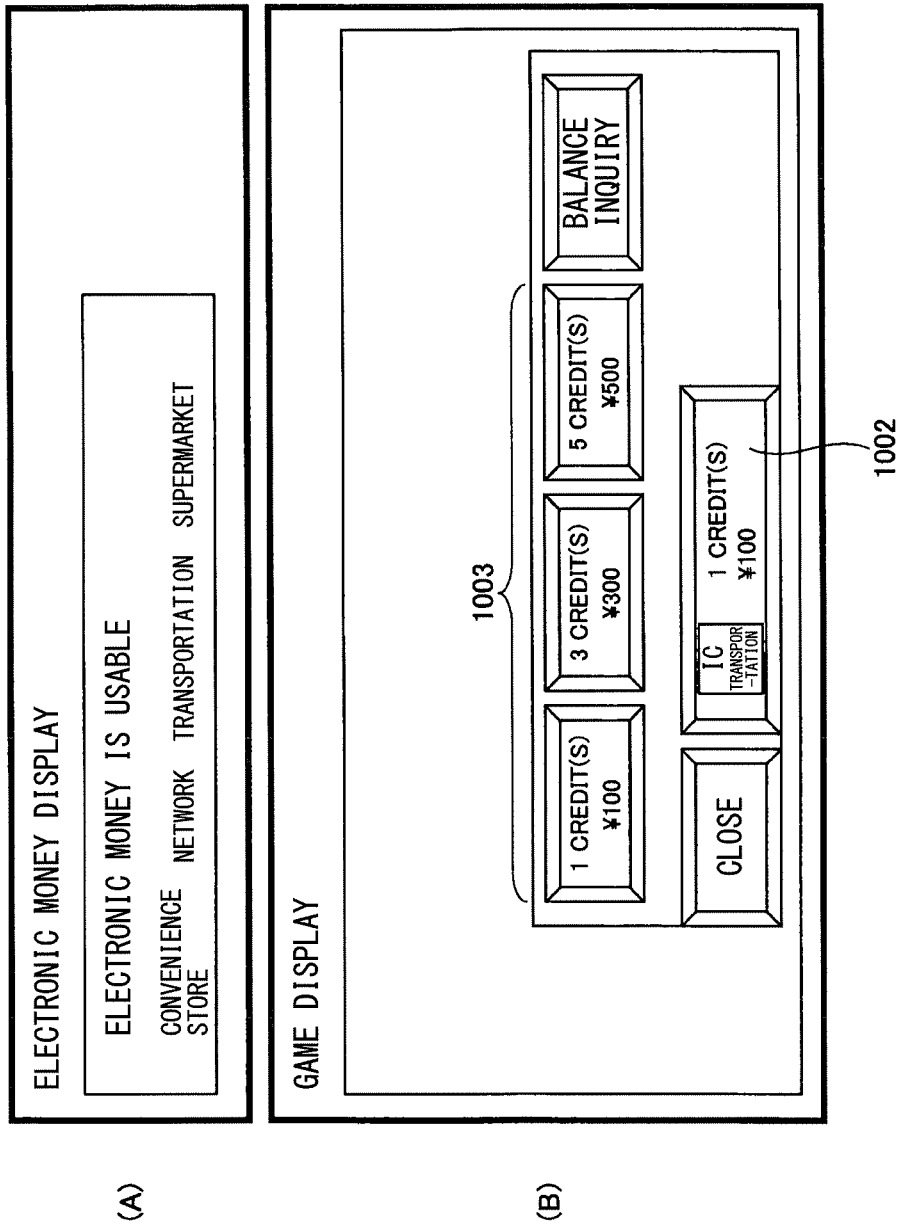
FIG. 11 is an image diagram illustrating an example of an amount input screen.

For example, when the menu button 1001 is pressed by the player at step S25, the setting information receiver 44 proceeds to step S26, generates an amount input screen as exemplified in FIG. 11, and causes the display controller 52 to display the amount input screen.

FIG. 11 is an image diagram illustrating an example of an amount input screen. FIG. 11(A) illustrates a screen image of the electronic money display 662. FIG. 11(B) illustrates a screen image of the game display. The game display screen illustrated in FIG. 11(B) includes the electronic money payment button 1002 and input buttons 1003 for inputting service types. By pressing one of the input buttons 1003, the player can select a service type (e.g., 5 CREDIT(S) ¥500). By pressing the electronic money payment button 1002 in FIG. 11(B), the player can obtain the same effect as that obtained by pressing the electronic money payment button 1002 in FIG. 10.

Figure 12:
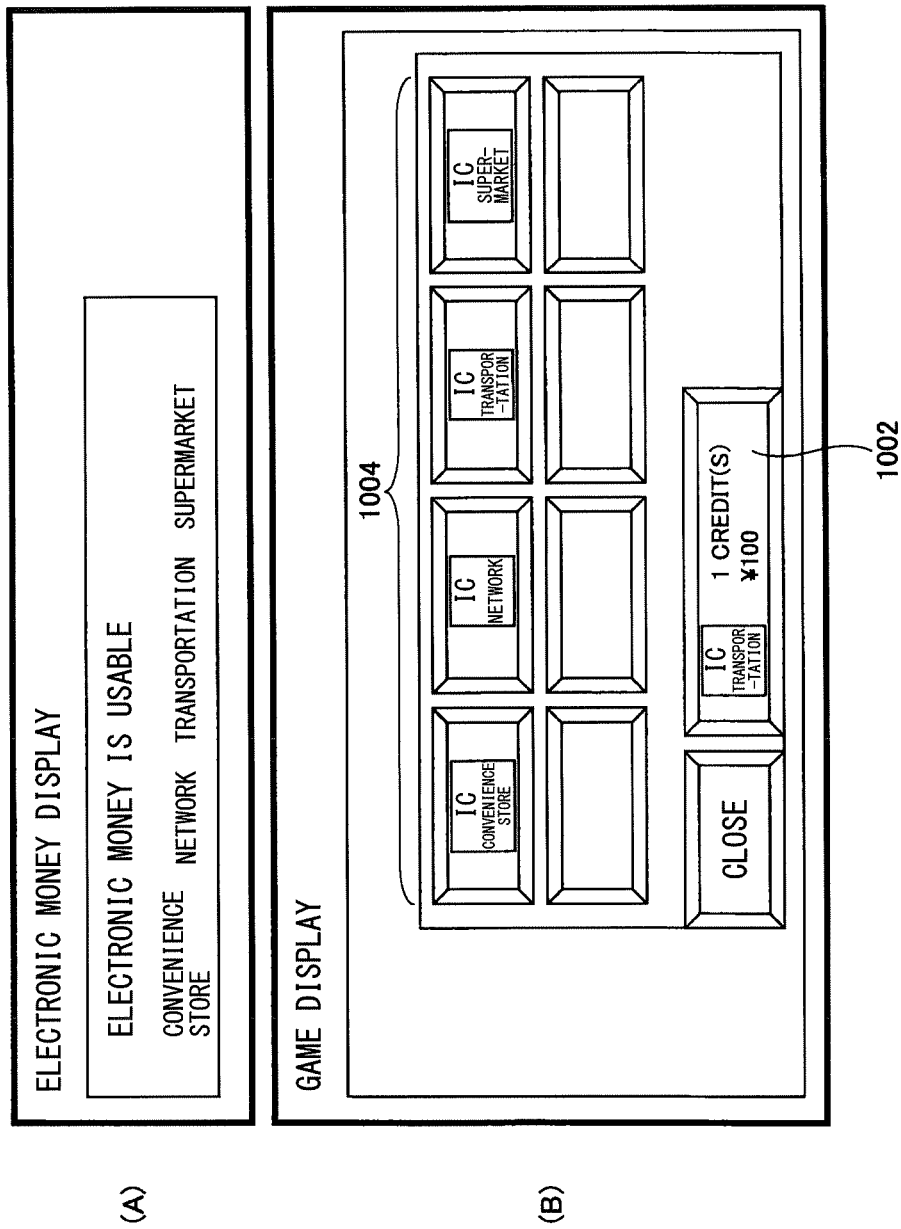
FIG. 12 is an image diagram illustrating an example of a brand selection screen.

When the player presses one of the input buttons 1003 corresponding to a service type, the setting information receiver 44 generates a brand selection screen as exemplified in FIG. 12 and causes the display controller 52 to display the brand selection screen.

FIG. 12 is an image diagram illustrating an example of a brand selection screen. FIG. 12(A) illustrates a screen image of the electronic money display 662. FIG. 12(B) illustrates a screen image of the game display. The game display screen illustrated in FIG. 12(B) includes the electronic money payment button 1002 and selection buttons 1004 for selecting types of electronic money. By pressing one of the selection buttons 1004, the player can select a type of electronic money (e.g., transportation). By pressing the electronic money payment button 1002 in FIG. 12(B), the player can obtain the same effect as that obtained by pressing the electronic money payment button 1002 in FIG. 10.

Figure 13:
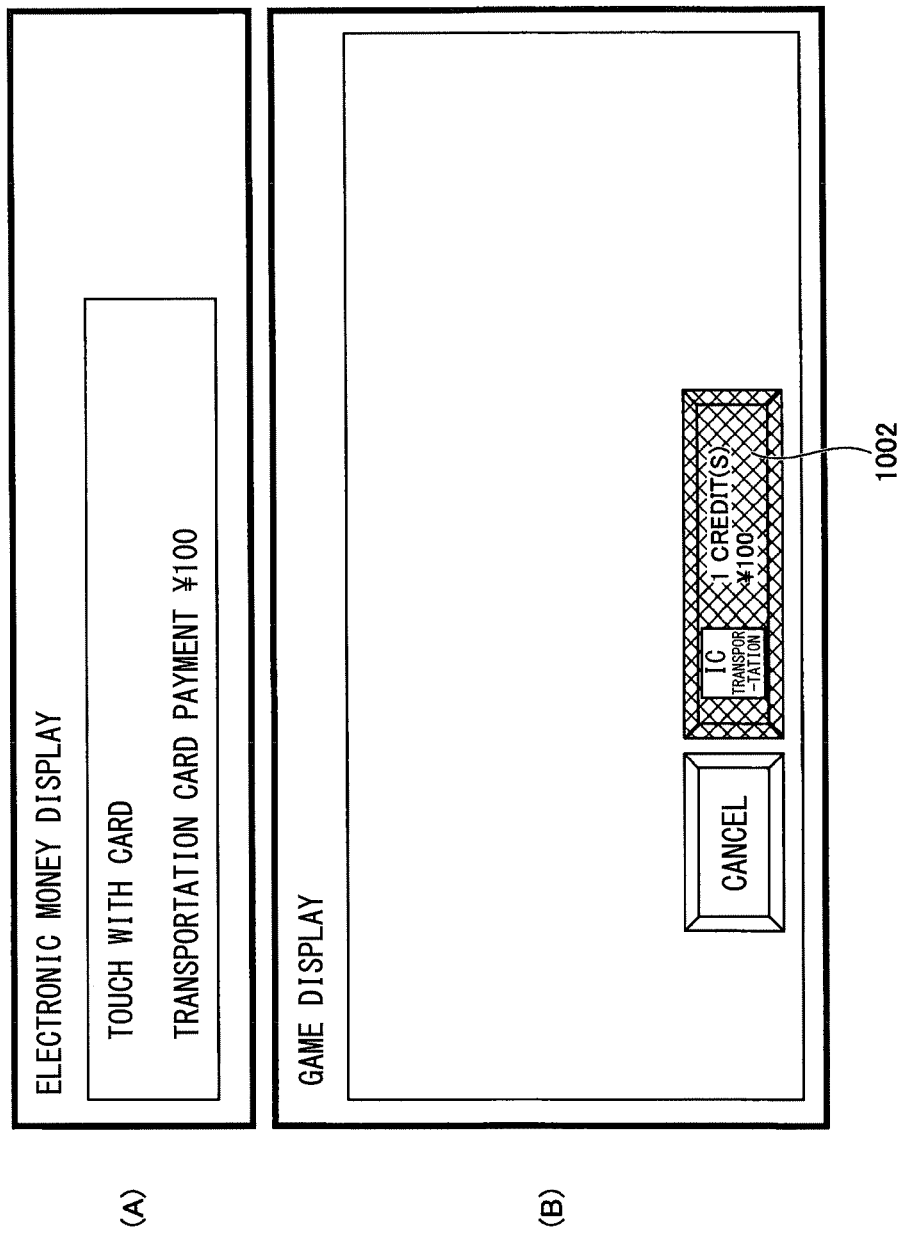
FIG. 13 is an image diagram illustrating an example of a card touch screen.

When the process proceeds from step S26 to step S27, the setting information receiver 44 causes the setting information storage 46 to record the service type and the type of electronic money selected by the player at step S26 as favorite settings. When the process proceeds from step S27 to step S29, the payment unit 48 generates a card touch screen as exemplified in FIG. 13 and causes the display controller 52 to display the card touch screen. FIG. 13 is an image diagram illustrating an example of a card touch screen. FIG. 13(A) illustrates a screen image of the electronic money display 662. FIG. 13(B) illustrates a screen image of the game display.

When the electronic money payment button 1002 is pressed by the player at step S25, the setting information receiver 44 proceeds to step S28, and sets a service type and a type of electronic money indicated by the favorite settings. Then, when the process proceeds from step S28 to step S29, the payment unit 48 generates a card touch screen as exemplified in FIG. 13, and causes the display controller 52 to display the card touch screen.

At step S30, the IC card unit 660 reads electronic money information from an electronic money IC card. At step S31, the payment unit 48 makes a payment for the service type and the type of electronic money selected by the player at step S26 by using the electronic money information read from the electronic money IC card. Alternatively, the payment unit 48 makes a payment for the service type and the type of electronic money set at step S28 by using the electronic money information read from the electronic money IC card.

During the payment process of step S31, the payment unit 48 causes the display controller 52 to display a payment process screen where the "Cancel" button in FIG. 13 cannot be pressed. When the payment process of step S31 is completed, the payment unit 48 causes the display controller 52 to display a payment completion screen where messages "Touch with card" and "Transportation card payment ¥100" on the electronic money display 662 in FIG. 13(A) are replaced with "Transportation card balance ¥1,000". Then, the player starts a game play with the purchased credit(s). At step S32, the game execution unit 50 performs a game play process. When the game play by the player ends, the game controller 40 proceeds to step S33, and displays a continue screen for allowing the player to select "continue" or "game over".

When "continue" is selected, the setting information receiver 44 returns to step S23, reads favorite settings from the setting information storage 46, and proceeds to step S24. The electronic money payment button 1002 in the payment standby screen generated at step S24 when "continue" is selected enables the player to select the service type and the type of electronic money, which are used by the player before the game play is continued, with a single operation. If "continue" is not selected, the game controller 40 proceeds to step S34, performs a game over process, and then ends the process of the flowchart in FIG. 9.

The guest player game process of FIG. 9 enables even a guest player having no game IC card to use the electronic money payment button 1002, to which standard setting information is assigned as favorite settings, for electronic money payment before continuation of a game play. Also, the guest player game process enables the player to use the electronic money payment button 1002, to which favorite settings used by the player before the continuation are assigned, for an electronic money payment after the continuation. Thus, the present embodiment makes it possible to reduce cumbersome electronic money payment operations performed by a player.

Here, because the player ID and the IC card ID of a guest player cannot be identified, the favorite settings are temporarily stored in the setting information storage 46 of the game apparatus 12. When a game play is continued, the electronic money payment button 1002 with the favorite settings is generated based on favorite setting information read from the setting information storage 46.

<<S15: Registered Player Game Process>>

Figure 14:
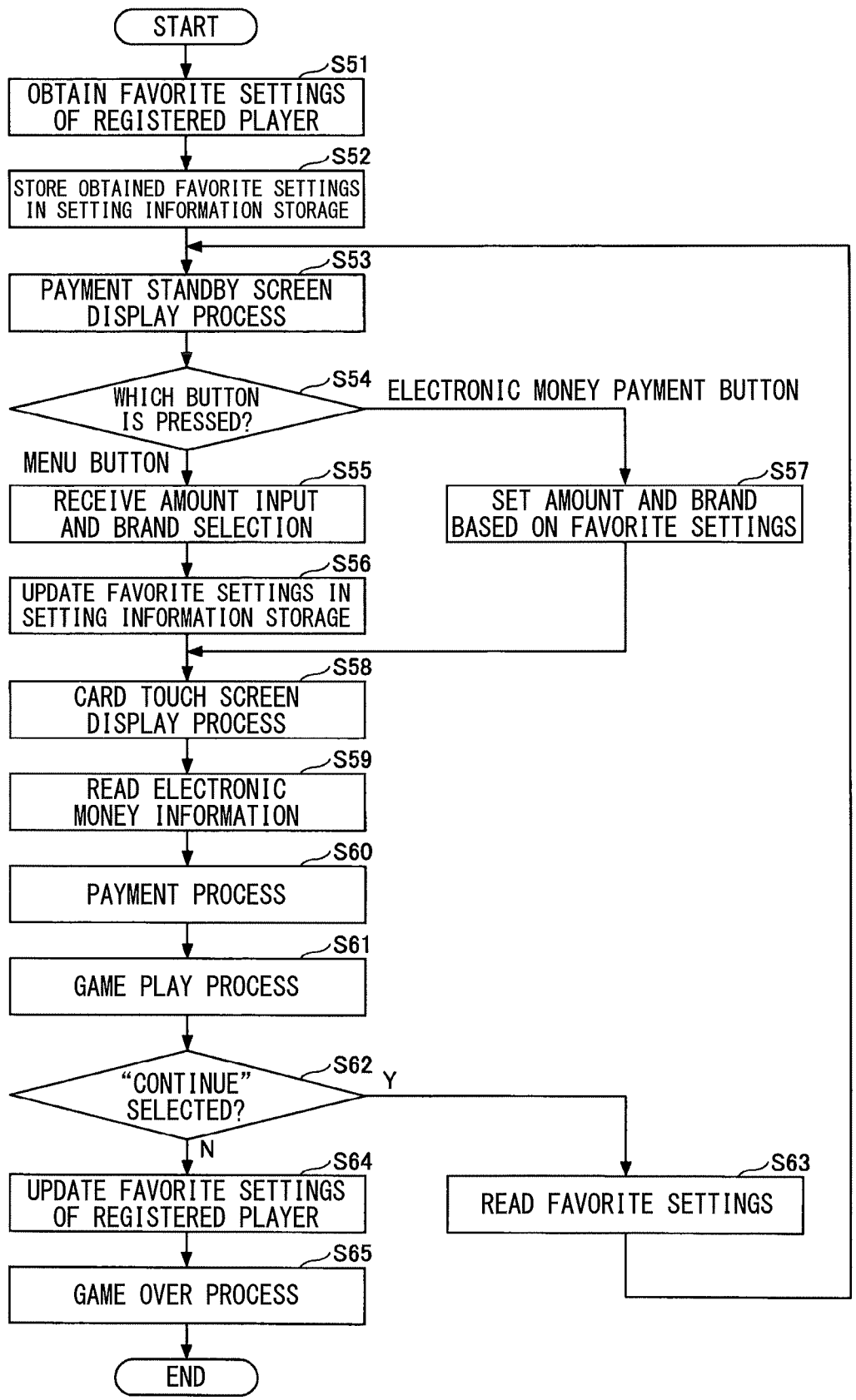
FIG. 14 is a flowchart illustrating an example of a registered player game process.

FIG. 14 is a flowchart illustrating an example of a registered player game process. Steps of the flowchart of FIG. 14 are substantially the same as those of the flowchart of FIG. 9 except for some steps, and the descriptions of the same steps may be omitted here.

At step S51, the player identification unit 42 obtains, from the server apparatus 10, player information associated with IC card information such as an IC card ID read from the game IC card. "Favorite setting information for electronic money payment" included in the obtained player information is used as favorite settings for a registered player.

At step S52, the player identification unit 42 stores the favorite settings of the player obtained at step S51 in the setting information storage 46. At step S53, the setting information receiver 44 generates a payment standby screen as exemplified in FIG. 10 based on the favorite settings obtained at step S51, and causes the display controller 52 to display the payment standby screen.

For example, when the menu button 1001 is pressed by the player at step S54, the setting information receiver 44 proceeds to step S55, generates an amount input screen as exemplified in FIG. 11, and causes the display controller 52 to display the amount input screen. By pressing one of the input buttons 1003, the player can select a service type (e.g., 5 CREDIT(S) ¥500).

When the player presses one of the input buttons 1003 corresponding to a service type, the setting information receiver 44 generates a brand selection screen as exemplified in FIG. 12 and causes the display controller 52 to display the brand selection screen. By pressing one of the selection buttons 1004, the player can select a type of electronic money (e.g., transportation).

The setting information receiver 44 proceeds from step S55 to step S56, and causes the setting information storage 46 to record the service type and the type of electronic money selected by the player at step S55 as favorite settings. At step S58 following step S56, the payment unit 48 generates a card touch screen as exemplified in FIG. 13 and causes the display controller 52 to display the card touch screen.

When the electronic money payment button 1002 is pressed by the player at step S54, the setting information receiver 44 proceeds to step S57, and sets the service type and the type of electronic money indicated by the favorite settings. Then, at step S58 following step S57, the payment unit 48 generates a card touch screen as exemplified in FIG. 13, and causes the display controller 52 to display the card touch screen.

At step S59, the IC card unit 660 reads electronic money information from an electronic money IC card. At step S60, the payment unit 48 makes a payment for the service type and the type of electronic money selected by the player at step S55 or a payment for the service type and the type of electronic money indicated by the favorite settings by using electronic money information read from the electronic money IC card.

During the payment process of step S60, the payment unit 48 causes the display controller 52 to display a payment process screen where the "Cancel" button in FIG. 13 cannot be pressed. When the payment process of step S60 is completed, the payment unit 48 causes the display controller 52 to display a payment completion screen where messages "Touch with card" and "Transportation card payment ¥100" on the electronic money display 662 in FIG. 13(A) are replaced with "Transportation card balance ¥1,000". Then, the player starts a game play with the purchased credit(s). At step S61, the game execution unit 50 performs a game play process. When the game play by the player ends, the game controller 40 proceeds to step S62, and displays a continue screen for allowing the player to select "continue" or "game over".

When "continue" is selected, the setting information receiver 44 proceeds to step S63, reads the favorite settings from the setting information storage 46, and returns to step S53. The electronic money payment button 1002 in the payment standby screen generated at step S53 when "continue" is selected enables the player to select the service type and the type of electronic money, which are used by the player before the game play is continued, with a single operation.

If "continue" is not selected, the process proceeds to step S64, where the player identification unit 42 updates "favorite setting information for electronic money payment" in the player information stored in the player information storage 32 of the server apparatus 10 with the favorite settings stored in the setting information storage 46. At step S65, the game controller 40 performs a game over process, and then ends the process of the flowchart in FIG. 14.

The registered player game process of FIG. 14 makes it possible to store "favorite setting information for electronic money payment" in the server apparatus 10 in association with an IC card ID readable from a game IC card, and thereby enables a player to use the electronic money payment button 1002 to which electronic money payment setting information used by the player is assigned as favorite settings. Also, the registered player game process enables the player to use the electronic money payment button 1002, to which favorite settings used by the player before the continuation are assigned, for an electronic money payment after the continuation. Thus, the present embodiment makes it possible to reduce cumbersome electronic money payment operations performed by a player.

<Examples of Favorite Setting Information for Electronic Money Payment>

FIG. 15 is a drawing illustrating examples of favorite setting information for electronic money payment. FIG. 15(A) is an example of "favorite setting information for electronic money payment" where the most-frequently or most-recently used electronic money brand and service type are associated with each other. In the example of FIG. 15(A), one combination of an electronic money brand and a service type is stored. However, two or more combinations of electronic money brands and service types may be stored, and two or more electronic money payment buttons 1002 may be displayed on the payment standby screen of FIG. 10.

In the example of FIG. 15(B), priority information is attached to each combination of an electronic money brand and a service type. With the example of FIG. 15(B), because priority levels are assigned to the combinations of electronic money brands and service types, it is possible to easily change the number of electronic money payment buttons 1002 displayed on, for example, the payment standby screen of FIG. 10.

In the example of FIG. 15(C), game play status information is attached to each combination of an electronic money brand and a service type. With the example of FIG. 15(C), even when the same player displays the payment standby screen of FIG. 10, the effect of pressing the electronic money payment button 1002 displayed on the payment standby screen of FIG. 10 can be changed depending on the status of a game play (for example, in a role-playing game, staying in town, searching field, or in combat).

The standard (default) setting information is not limited to fixed setting information composed of a predetermined brand and a predetermined service. For example, the standard (default) setting information may be updated with a combination of a brand and a service that are most frequently selected by unspecified players in the past or a combination of a brand and a service that are most recently selected, and the updated standard (default) setting information may be displayed as the electronic money payment button 1002. This makes it possible to reduce cumbersome electronic money payment operations not only for a player with a player ID but also for a guest player.

<Variation>

In the example of the above embodiment, a combination of a brand and a service type selected by the player is displayed as the electronic money payment button 1002. Alternatively, the electronic money payment button 1002 may be generated and displayed by combining one of a brand and a service type selected by the player and one of a stored brand and a stored service type not selected by the player.

For example, when a service (event) for a paid lottery is generated during a game and the player selects the event to do the paid lottery, the service type is not included in the favorite settings already stored in the setting information storage 46. Even in this case, because it is preferable to use a normally-used brand, the electronic money payment button 1002 may be generated and displayed based on a combination of a new service corresponding to the selected event and a brand included in the favorite settings stored in the setting information storage 46.

This method makes it possible to easily make a payment even for a newly-generated service by using electronic money of a normally-used brand. In this case, brands that are included in the favorite settings but have a balance less than the price of the generated service may be excluded from being combined with the generated service.

SUMMARY

As described above, the present embodiment makes it possible to reduce cumbersome electronic money payment operations for both of a registered player and a guest player.

The present invention is not limited to the specifically disclosed embodiments, and variations and modifications may be made without departing from the scope of the present invention. For example, the game apparatus 12 is not limited to an apparatus installed in the shop 14, but may also be, for example, a PC, a smartphone, a tablet, or a home game machine.

Payments with electronic money according to the present embodiment may include payments with a charged medium and a prepaid medium in which paid amounts are subtracted from a fixed amount, payments with media such as a credit card and a debit card, and payments with media other than cards, such as a built-in medium of a mobile terminal.

EXPLANATION OF REFERENCE NUMERALS 1 game system
10 server apparatus
12 game apparatus
14 shop
20, 22 network
30 player manager
32 player information storage
40 game controller
42 player identification unit
44 setting information receiver
46 setting information storage
48 payment unit
50 game execution unit
52 display controller
660 IC card unit
661 IC card reader-writer
662 electronic money display
1001 menu button
1002 electronic money payment button

The invention claimed is:

1. A game system that makes an electronic money payment, the game system comprising:
   a processor programmed to execute a process including
      receiving an input of setting information related to use of a service for the electronic money payment from a player when the service is used;
      reading electronic money information from a recording medium that records the electronic money information;
      making the electronic money payment corresponding to the setting information related to the use of the service and received from the player by using the electronic money information read from the recording medium;
      receiving an input of information associated with player information from the player and identifying the player by obtaining the player information associated with the information; and
      recording the setting information, which is related to the use of the service and input by the identified player, as first setting information in the player information of the player,
   wherein if the player has been identified when the service is used, the processor is programmed to generate a screen for receiving the input of the setting information from the player based on the first setting information recorded in the player information of the identified player; and
   wherein if the player has not been identified when the service is used, the processor is programmed to generate the screen for receiving the input of the setting information from the player based on pre-recorded second setting information different from the first setting information.

2. The game system as claimed in claim 1, wherein when the setting information is input to use the service in a state where the player has been identified, the processor is programmed to record the input setting information as new first setting information in the player information.

3. The game system as claimed in claim 1, wherein when the setting information is input in an occasion other than using the service in a state where the player has been identified, the processor is programmed to record the input setting information as new first setting information in the player information.

4. The game system as claimed in claim 1, wherein at least one of a charged medium, a prepaid medium, a credit card, and a debit card is used for the electronic money payment.

5. The game system as claimed in claim 1, wherein the processor is programmed to allow the player to play a game after the electronic money payment or a payment with a coin inserted into a coin insertion unit is made.

6. A game system that makes an electronic money payment, the game system comprising:
 a processor programmed to execute a process including
  receiving an input of setting information related to use of a service for the electronic money payment from a player when the service is used;
  reading electronic money information from a recording medium that records the electronic money information;
  making the electronic money payment corresponding to the setting information related to the use of the service and received from the player by using the electronic money information read from the recording medium;
  receiving an input of information associated with player information from the player and identifying the player by obtaining the player information associated with the information; and
  recording the setting information, which is related to the use of the service and input by the identified player, as first setting information in the player information of the player, wherein
 the player information includes the information associated with the player information, identification information of the player, and the first setting information, the first setting information including a type of the service previously used by the player and a type of electronic money previously used by the player to make a payment for the use of the service that are associated with each other; and
 if the player has been identified when the service is used, the processor is programmed to generate a screen for enabling the player to input, through a single operation, the type of the service previously used by the player and the type of electronic money previously used by the player to make the payment for the use of the service, which are included in the first setting information recorded in the player information that includes the identification information of the identified player.

7. The game system as claimed in claim 6, wherein when the player selects one of the type of the service and the type of electronic money, the processor is programmed to receive inputs of the type of the service and the type of electronic money through a single operation by combining the selected one of the type of the service and the type of electronic money with one of the type of the service previously used by the player and the type of electronic money previously used by the player to make the payment for the use of the service, which is included in the first setting information recorded in the player information and not selected by the player.

8. A game apparatus that makes an electronic money payment, the game apparatus comprising:
 a processor programmed to execute a process including
  receiving an input of setting information related to use of a service for the electronic money payment from a player when the service is used;
  reading electronic money information from a recording medium that records the electronic money information;
  making the electronic money payment corresponding to the setting information related to the use of the service and received from the player by using the electronic money information read from the recording medium;
  receiving an input of information associated with player information from the player and identifying the player by obtaining the player information associated with the information; and
  recording the setting information, which is related to the use of the service and input by the identified player, as first setting information in the player information of the player,
 wherein if the player has been identified when the service is used, the processor is programmed to generate a screen for receiving the input of the setting information from the player based on the first setting information recorded in the player information of the identified player; and
 wherein if the player has not been identified when the service is used, the processor is programmed to generate the screen for receiving the input of the setting information from the player based on pre-recorded second setting information different from the first setting information.

* * * * *